US008610839B2

(12) United States Patent
New et al.

(10) Patent No.: US 8,610,839 B2
(45) Date of Patent: Dec. 17, 2013

(54) OPTICAL PROCESSING

(75) Inventors: Nicholas James New, Pontefract (GB); Andrew John Lowe, Pontefract (GB); Timothy David Wilkinson, Pontefract (GB); John Robert Brocklehurst, Pontefract (GB)

(73) Assignee: Optalysis Ltd., Pontefract (GB)

( * ) Notice: Subject to any disclaimer, the term of this patent is extended or adjusted under 35 U.S.C. 154(b) by 995 days.

(21) Appl. No.: 12/530,058

(22) PCT Filed: Mar. 10, 2008

(86) PCT No.: PCT/GB2008/000828

§ 371 (c)(1),
(2), (4) Date: Oct. 8, 2009

(87) PCT Pub. No.: WO2008/110779

PCT Pub. Date: Sep. 18, 2008

(65) Prior Publication Data

US 2010/0085496 A1 Apr. 8, 2010

(30) Foreign Application Priority Data

Mar. 13, 2007 (GB) .................................. 0704773.1

(51) Int. Cl.
*G06K 9/36* (2006.01)
*G02F 1/1335* (2006.01)

(52) U.S. Cl.
USPC ............................................ 349/17; 382/280

(58) Field of Classification Search
USPC .............. 349/17; 345/694; 382/280; 708/821
See application file for complete search history.

(56) References Cited

U.S. PATENT DOCUMENTS

| | | | | |
|---|---|---|---|---|
| 5,511,019 | A * | 4/1996 | Grycewicz et al. | 708/816 |
| 5,619,596 | A * | 4/1997 | Iwaki et al. | 382/278 |
| 6,804,412 | B1 | 10/2004 | Wilkinson | |

FOREIGN PATENT DOCUMENTS

| | | | |
|---|---|---|---|
| EP | 98959045.0 | B1 | 6/1999 |
| EP | 03029116.5 | A2 | 5/2004 |
| WO | PCT/UK03/00392 | A1 | 8/2003 |

OTHER PUBLICATIONS

Davis, J. A., et al., "Fractional Derivatives—Analysis and Experimental Implementation", Applied Optics, vol. 40, No. 32, Nov. 10, 2001, pp. 5943-5948, XP007904976.

Davis, J. A., et al., "Operation of Liquid-Crystal Displays for Optical Computing", Proceedings of the SPIE, Photonic Devices and Algorithms for Computing VII, Aug. 1, 205, vol. 5907, No. 590701, XP007904979.

Flannery, D. L., et al., "Fourier Optical Signal Processors", Proceedings of the IEEE, vol. 77, No. 10, Oct. 1989, pp. 1511-1526, XP000085328.

Dodson, J., "Cambridge Correlators: Thomas Swan & Co. Board Presentation Apr. 2004", 2005, XP007904917.

Zhong, S., et al., "Binary Joint Transform Correlator Based on Differential Processing of the Joint Transform Power Spectrum", Applied Optics, vol. 36, No. 8, Mar. 10, 1997, pp. 1776-1780, XP007904990.

International Search Report from corresponding international patent application No. PCT/GB2008/000828 dated Jul. 1, 2008, 2 pages.

* cited by examiner

*Primary Examiner* — Edward Glick
*Assistant Examiner* — David Chung
(74) *Attorney, Agent, or Firm* — Maier & Maier PLLC

(57) ABSTRACT

An optical processing system is described that allows rapid evaluation of derivatives and partial derivatives by means of optical Fourier transformation. In embodiments, separate filtering steps are used to provide phase and amplitude changes.

3 Claims, 9 Drawing Sheets

OPTICAL PROCESSING

RELATED APPLICATIONS

The present invention claims priority under 35 U.S.C. §119 to Great Britain Patent Application No. 0704773.1, filed on Mar. 13, 2007, the disclosure of which is incorporated by reference herein in its entirety.

FIELD OF THE INVENTION

The present invention relates to the general field of optical processing. Embodiments allow calculation of full or partial derivatives, and enable solutions to large numerical simulations to be achieved.

BACKGROUND OF THE INVENTION

Such simulations commonly suffer from very high process times—often taking weeks or even months to complete. In an exemplary technical field, that of computational fluid dynamics, for instance, the modelling of anything beyond simple fluid motion is still far beyond the capabilities of even today's powerful processor arrays and supercomputers. Turbulence modelling is one such example of this.

There is therefore a clear demand for solutions which offer a step boost in reducing process time and advance capability.

SUMMARY OF THE INVENTION

There is disclosed an optical processing apparatus and method that enables calculation or evaluation of derivatives. Some embodiments of this have an advantage of provision of one or more optical devices to provide amplitude variations and one or more to provide phase variations There is disclosed a method of calculating derivatives of a variable, the method comprising forming an optical Fourier transform of an input function, applying radiation representative of the optical Fourier transform to a complex filter function to derive an optical distribution, and forming an optical Fourier transform of the optical distribution.

The method may further comprise providing a phase-only pattern and an intensity pattern, and the applying step may comprise applying the radiation to one of the phase only pattern and the intensity pattern followed by the other of the phase only pattern and the intensity pattern.

The phase-only pattern may be formed on a binary spatial light modulator.

The intensity-only pattern may be formed on a twisted nematic spatial light modulator.

The intensity-only pattern may be formed on a vertically-aligned nematic spatial light modulator.

The complex filter function may be two-dimensional. In other embodiments, the complex filter function is one-dimensional.

There is disclosed a device for calculating derivatives of a variable, the device having a display configured to display an input function, an optical device configured to provide an optical Fourier transform of light from the input function, a spatial light modulation system configured to display a representation of a complex filter function, the spatial light modulation system being disposed to receive the optical Fourier transform of light from the input function, a second optical device configured to receive the product of the optical Fourier transform of light from the input function and the filter function to provide an intensity distribution, and a sensor for providing data indicative of the intensity distribution.

In the device the spatial light modulation system may have a first phase-only SLM and a second intensity-only SLM. The order of occurrence of these two SLMs is arbitrary.

There may be operating circuitry for providing a two-dimensional distribution across the spatial light modulation system.

The display and the spatial light modulation system may comprise a single spatial light modulator.

There is also disclosed a device for calculating derivatives of a variable, the device having a spatial light modulator configured to display an input function beside a complex filter function, an optical device configured to provide an optical Fourier transform of light from the input function and the complex filter function onto a detection plane; a sensor for picking up light at the detection plane to derive a joint power spectrum, and circuitry for providing the joint power spectrum on the spatial light modulator, whereby the optical device provides, on the detection plane, a pair of derivatives.

By constructing suitable generic "filters", full and partial nth-order derivatives calculations may be performed in 1, 2 or even potentially 3-dimensions on arbitrary input data sets. Because of the inherently parallel nature of the optical processing, the resolution of the data sets used may be extended far beyond the capabilities of current state of the art electronic processor arrays. This can be extended to optically calculating a large range of mathematical operators.

Derivative calculations are used extensively in CFD and large numerical simulations. This is due to the fact that many of the formulae used to describe the fundamental laws of science and economics, may be expressed as differential equations. Examples of these are equations from mathematical physics that include Navier-Stokes (fluid motion), Newton's Second Law (mechanics); Maxwell's equations (electromagnetics) and in economics, Black-Scholes equation. Applications abound including for example image edge enhancement.

It is envisaged that the system may be employed as a co-processor within such large numerical processes, to provide a step boost in performance and functionality over current electronic/software—based systems. A typical and alternative form of the proposed system is provided, in addition to simulation results that prove the concept being described. An alternative field of use is a modular component of an all-optical solver.

BRIEF DESCRIPTION OF THE DRAWINGS

Embodiments will now be described, by way of example only, with reference to the accompanying drawings in which.

DESCRIPTION OF EMBODIMENTS

The main technique that is used in calculating derivatives of variables within large numerical simulations uses Fourier Transforms—the decomposition of a signal into its component frequency parts. A Fourier Transform of an input term is defined as:

$$\begin{aligned} G(u) &= FT[g(x)] \\ &= \int_{\pm\infty} g(x)\exp[-i2\pi xu]\,dx \end{aligned} \tag{1}$$

where: g(x)=input function; x=space or time variable; u=spatial or temporal frequency variable.

The derivatives of the variable in question are calculated at each point using a fundamental and well known property of Fourier Transforms: that the nth-order derivative of a function may be defined as:

$$\frac{d^n g(x)}{dx^n} = FT[(i2\pi u)^n G(u)] \tag{2}$$

For example, in a typical CFD process, the fluid being modelled may be discretised into a 3-dimensional "box" of dimensions 256×256×256 data points. For each point within the box, the derivative of each variable (in each of the three coordinate directions) must be calculated at each time step. The number of derivatives being considered may be as large as 20 and the number of time steps may be of the order of 10,000. Therefore, since there are 2 Fourier transform stages (the transform and the inverse transform), the number of Fourier Transforms which must be calculated in total will be of the order of 2×(256)3×20×10,000=6.71 trillion.

Using a high-end, single core PC calculating one-dimensional Fast Fourier Transform approximations, this process can take in the order 2 weeks.

The above example relates to the modelling of a simple fluid motion, such as a spoon being moved slowly in a cup of coffee. Larger simulations that model faster or larger fluid motion require higher resolution "boxes", which can only be feasibly conducted on state of the art supercomputers, still taking weeks or even months to complete. Currently, the highest resolutions being used are (4096)3 boxes, but these still do not relate to anything above relatively simple motions. This is why complex fluid motions such as turbulence cannot be modelled at present. Continuing the example above with the increased resolution, the PC would take in the order of 4300 years to complete the process. The need for a step boost in processing power is therefore highly apparent.

In the field of coherent optical processing, a commonly used tool is the two-dimensional Optical Fourier Transform (OFT). The OFT is directly analogous to the pure mathematical Fourier Transform (FT) definition and to the Fast Fourier Transform (FFT) family of algorithm approximations, commonly employed in software processes. Extending the general form of the Fourier Transform into two-dimensions gives:

$$\begin{aligned} G(u, v) &= FT[g(x, y)] \\ &= \int\int_{\pm\infty} g(x, y)\exp[-i2\pi(ux + vy)]\,dx\,dy \end{aligned} \tag{3}$$

where: x,y=space/time variables, u,v=spatial/temporal frequency variables

Figure 1:
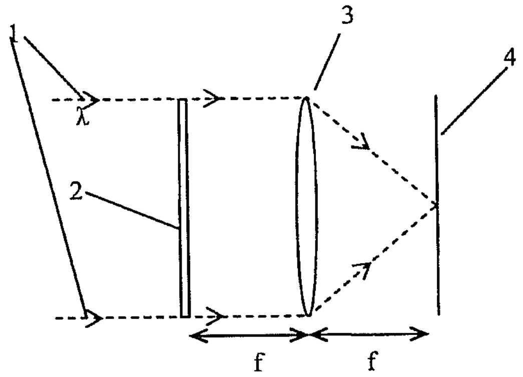
Figure 1 (Prior Art)
FIG. 1 shows a single lens-based Optical Fourier Transform (OFT) system.

FIG. 1 shows how a two-dimensional OFT may be produced by means of a simple optical system. Briefly, if an input function of transmittance g(x,y) is placed in the front focal plane [2] of a positive converging lens [3] of focal length f and illuminated with collimated, coherent light [1] of wavelength λ, its Fourier Transform G(u,v) will be formed in the rear focal plane of the lens [4]. Although a positive converging lens is used in this example, the theory is analogous with other types of Optical Fourier Transforming devices, such as curved mirrors and Diffractive Optical Elements—all of which can be equally applied within the scope of this invention. This process is used as the building block of a range of systems, including optical correlators.

A key feature of the OFT is that the process time is unaffected by increases in resolution, owing to the inherent parallelism of the optical process. In practical terms, this is ultimately limited by the speed at which the images (or other two-dimensional data) can be dynamically entered into the optical system. Commonly used input devices are Liquid Crystal Spatial Light Modulators (LCSLMs), for which greyscale frame rates are currently of the order of 60-200 Hz for megapixel (and above) resolutions. Development of higher speed greyscale devices mean that frame rates in excess of 1 kHz should soon become readily available for similar resolutions. This would mean that the previously explored example of a 4096^3 cube would take the 1 kHz optical system around 2.4 days to calculate, compared to the PC process time of 4300 years.

Figure 2:
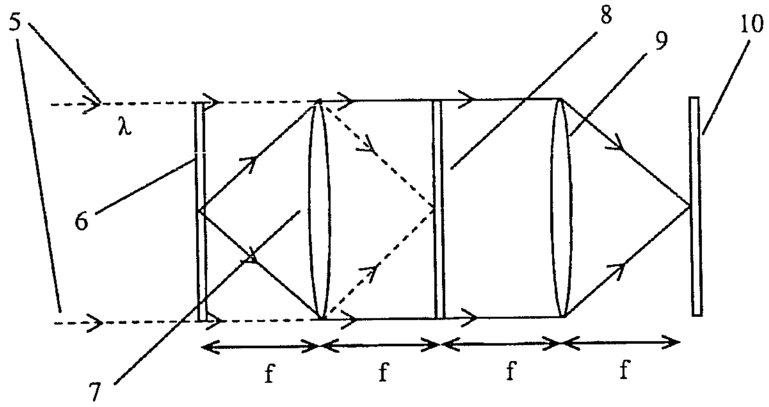
Figure 2 (Prior Art)
FIG. 2 shows a classical 4-f optical processing system.

In a first embodiment of the invention, a 4-f optical system is used. 4-f systems have two Fourier Transform stages. They allow manipulation of the Fourier components of the input term by means of a "filter" being placed in the centre of the optical system (the Fourier Plane). FIG. 2 shows a classical 4-f system outline.

Here, an input function of transmittance g(x,y) is displayed (typically using an LCSLM) in the front focal plane [6] of the positive converging lens [7] of focal length f. Collimated, coherent light [5] of wavelength, λ, is used to illuminate the input function, producing its Fourier Transform G(u,v) in the rear focal plane [8] of lens [7]. This is positioned to coincide with the front focal plane of a second positive converging lens [9], also of focal length f. Also positioned in rear focal plane [8] is a filter function (typically displayed using an LCSLM) of transfer function H(u,v). The field behind this filter is therefore GH. In the rear focal plane [10] of the second lens [9], the Fourier Transform of the field GH will then be produced, the intensity distribution of which may be captured by a suitable photodiode array, Charge Coupled Device (CCD), or CMOS sensor. This distribution will be a convolution of the form:

$$\left|\int\int_{\pm\infty} g(x, y)h(u - x, v - y)\,dx\,dy\right|^2 \tag{4}$$

(note that the upper case G and H denotes the Fourier Transforms of functions g and h respectively).

Figure 3:
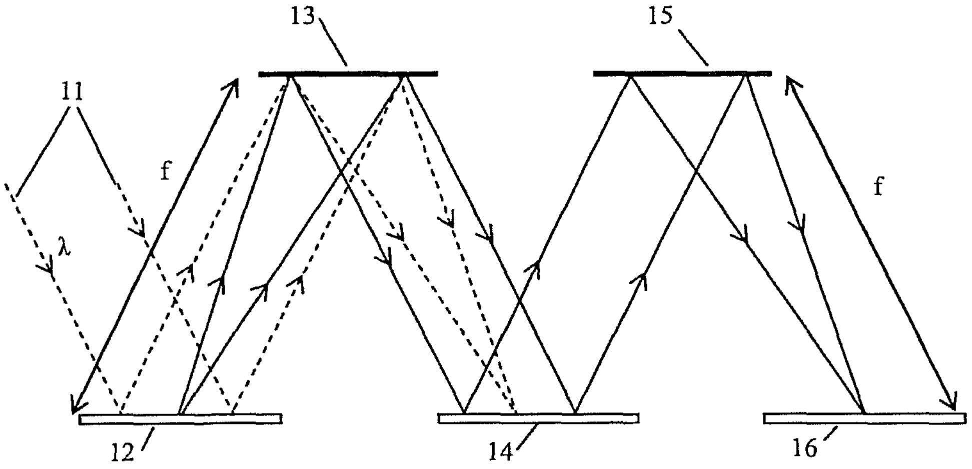
FIG. 3 shows an alternative embodiment of a 4-f optical processing system.

FIG. 3 shows an alternative 4-f embodiment, which replaces the Fourier Transform lenses with reflective Diffractive Optical Elements (DOEs) and produces a more compact, folded arrangement more suited to the requirements of a co-processor. It will be apparent to those skilled in the art that other variations on the basic 4-f system layout would be equally effective and in the scope of the present invention.

Here, the two LCSLM and CMOS (or variations) components may be aligned in the same plane. This has beneficial effects when realising such a system in terms of reducing the overall physical length of the optical system and for optimising the physical layout of the electronics. The overall effect produced is analogous to that described for FIG. 2. In this case fixed Diffractive Optical Elements (DOEs) [13], [15] have been used instead of the Fourier Transform lenses. Alternatively, one or more curved mirrors may be used.

To simplify the physical assembly and drive electronics of the system, the input SLM [12] and filter SLM [14] may be adjacent halves of the same physical device (so for a 1920×1080 pixel device, the two halves of 960×1080 pixels each could be used). Using this arrangement has the benefit that the front and rear focal planes of Fourier transforming component [13] are now in a common plane, simplifying the distance alignment of the SLM devices to each other and the FT component.

Input function g(x,y) is displayed in the effective front focal plane [12] of the first DOE [13] and illuminated with collimated coherent light [11] of wavelength λ. The Fourier Transform of the input function, G(u,v) then occurs at the rear focal plane [14] of the first DOE, which is coincident with the front focal plane of the second DOE [15], of effective focal length f. Positioned here is also the transfer function H, producing the field GH. The Fourier Transform of GH is then produced in the rear focal plane of the second DOE [16], where a suitable sensor array is positioned to capture the result intensity distribution as described above.

Figure 4:
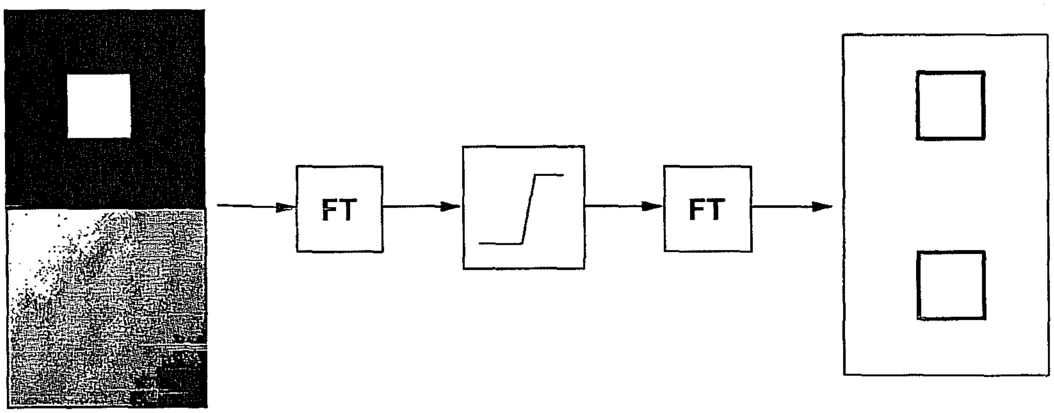
FIG. 4 shows an alternative optical processing system which may be employed.

FIG. 4 represents an alternative optical architecture based around the joint transform correlator (JTC). The input image and derivative reference are displayed at the input side by side. The derivative reference is faulted by taking the Fourier transform of the desired filter function from equation (2). The input then follows the optical path of the JTC (as described in U.S. Pat. No. 6,804,412, EP 98959045.0, EP 03029116.5, PCT/UK2003/00392) where it undergoes a non-linear function (such as CCD detection) before being redisplayed as the joint power spectrum. The second Fourier transform then generates a pair of derivatives in the output plane as demonstrated in FIG. 4. The reference function shown in FIG. 4 represents that which would be displayed.

Figure 5:
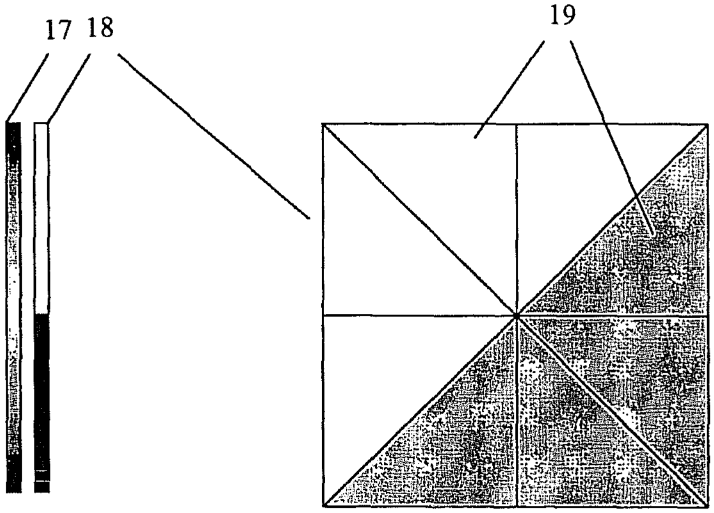
FIG. 5 shows a filter modulation device that may be used in the optical system.

FIG. 5 shows a filter modulation device that may be used to enter the complex filter functions into the optical system. The filter, H, comprises of a linear complex term (i2□u) in the Fourier (filter) plane, where the direction of u corresponds to the direction of the derivative (x). This term is raised to the power of the derivative n. The corresponding complex filter function can be split into its two parts, magnitude [17] and phase [18]. This allows 2 separate devices to be used in tandem as the filter. This is made even simpler by the fact that the phase is a very simple binary function as demonstrated in FIG. 6.

Figure 6:
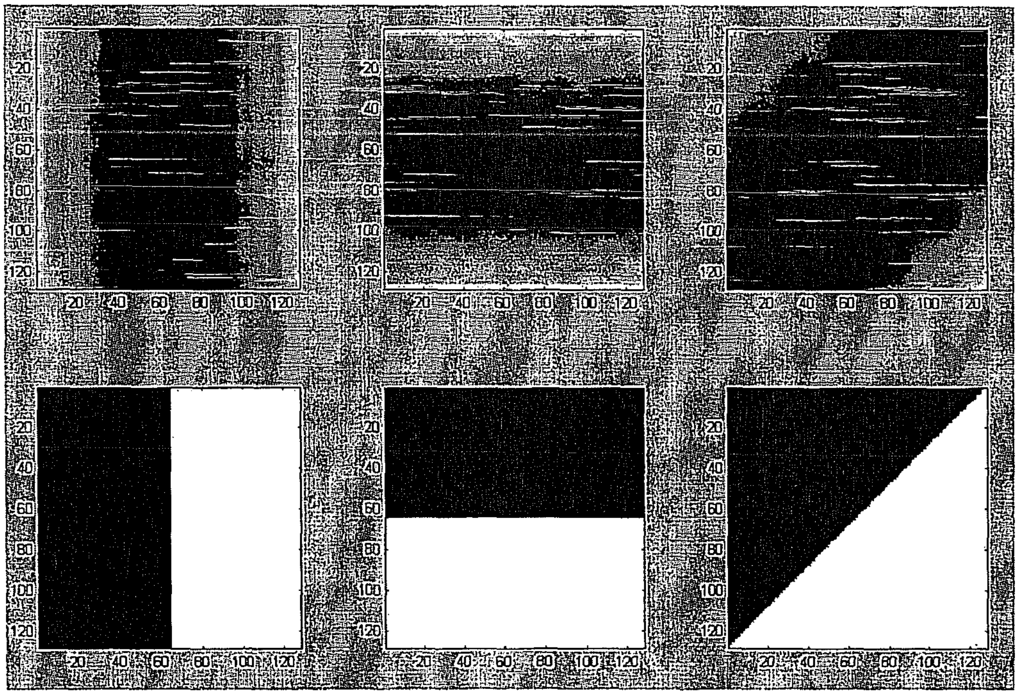
FIG. 6 shows the calculated first order derivative filter functions.

A complex filter can be made from a binary phase only device (such as nematic or FLC, [18]) with a very simple pattern of electrodes to make the required phase pattern. The intensity pattern can be displayed on a twisted nematic or vertically aligned nematic device [17]. The binary phase device [18] only needs to display 3 simple patterns as shown in FIG. 6. For a filter to produce a two-dimensional derivative, this can be done using triangular pixels as shown in the front view of [19], with 8 sections [19]. Rectangular or square pixels may be used in the filter to produce one-dimensional derivatives.

FIG. 6 shows a first order (n=1) derivative filter function, calculated by generating the filter term (i2□u)n from equation (2). This then forms the filter function indicated by point 8 in FIG. 2. The direction of the derivative can be controlled through the spatial frequencies of u and v. Top right of FIG. 6 is the u spatial frequency and gives the x derivative, the lower right panel is the phase. The central panels represent the v (and therefore y) derivatives and the rightmost panel shows the combined 2D filter for the xy derivative.

The device used to display the filter term must display this function and it is fully complex, however the separation between the phase and the intensity is simple as shown in the 3 filter intensities in the upper half of FIG. 6. The upper row are the (left to right) x, y and xy first order derivative filters and the lower row are their corresponding phases (white=+pi/2 and black=−pi/2). This simple structure is also continued on for higher degree of n derivatives.

Figure 7:
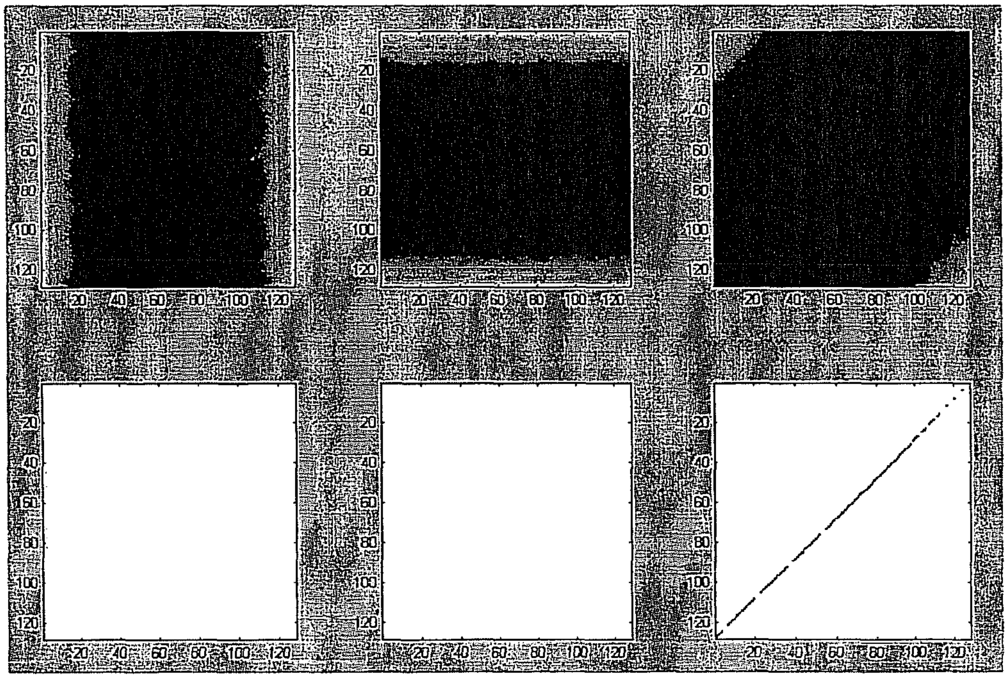
FIG. 7 shows the calculated second order derivative filter functions.

FIG. 7 shows a second order (n=2) derivative filter function, calculated by taking the square of the previous function shown in FIG. 6. Again, the upper row are the (left to right) x, y and xy first order derivative filters and the lower row are their corresponding phases (in this case all +pi). The line in the lower left phase is an error term due to the rounding at the interface.

Figure 8:
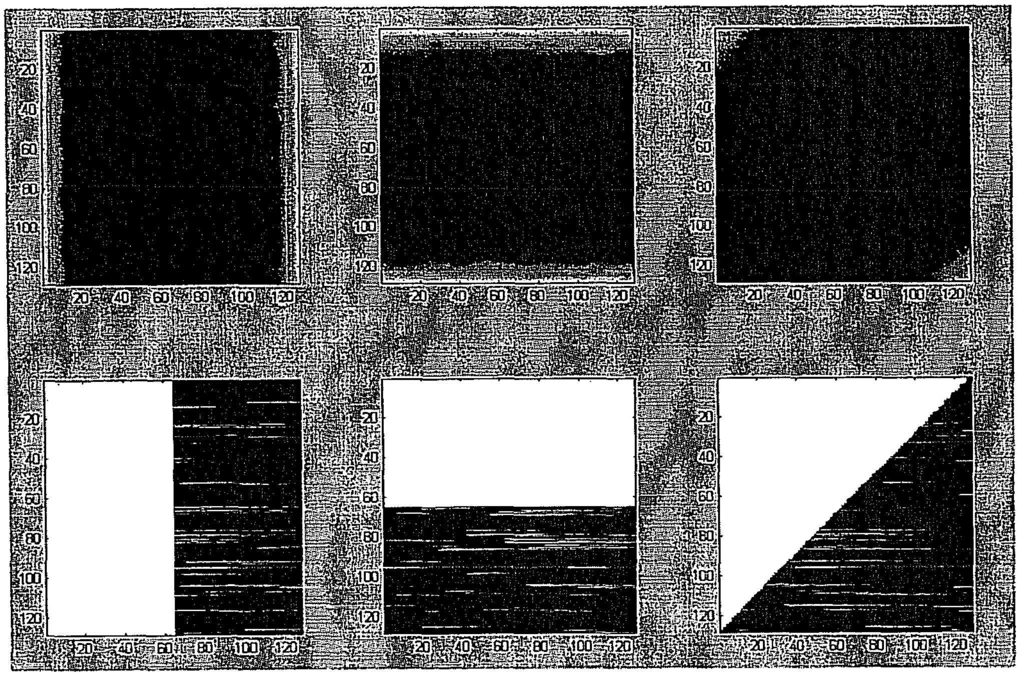
FIG. 8 shows the calculated third order derivative filter functions.

FIG. 8 shows a third order (n=3) derivative filter function using the same layout.

Figure 9:
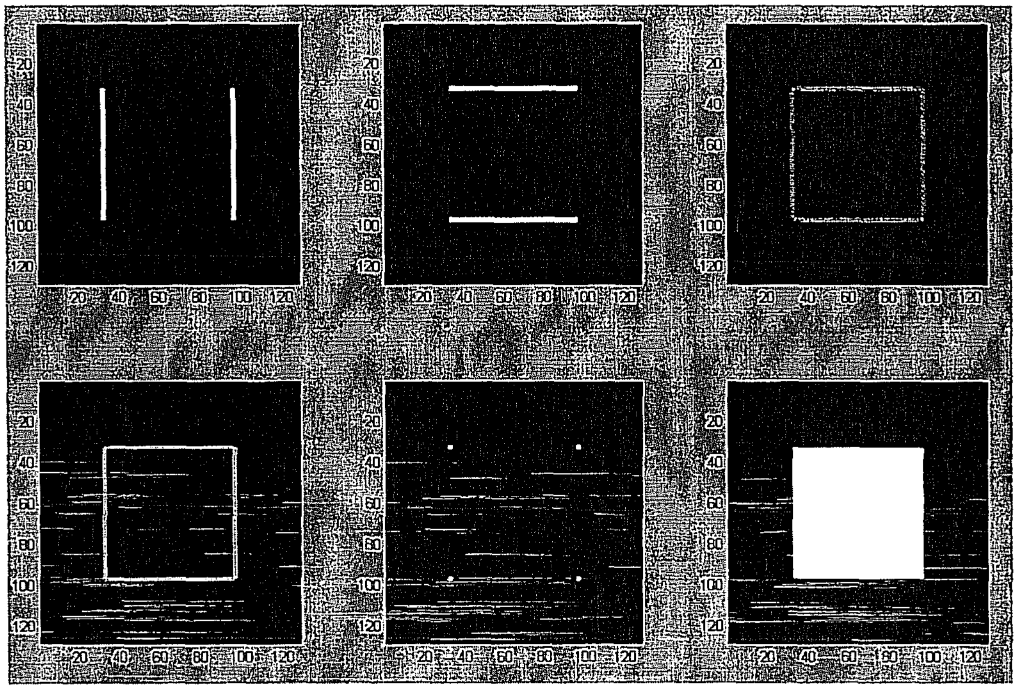
FIG. 9 shows the results of applying the first order filter in FIG. 6 to an input function.

FIG. 9 shows the simulation results of applying the first order filters (shown in FIG. 6) in the optical system, to a simple input function. The input function g(x,y) is shown in the bottom right image. The other images in FIG. 9 are as follows:

Top left is the result of applying the x-direction filter (top left and bottom left intensity and phase images from FIG. 6), giving the result:

$$\frac{\partial g(x,y)}{\partial x} \tag{5}$$

Top middle is the result of applying the y-direction filter (top middle and bottom middle intensity and phase images in FIG. 6), giving the result:

$$\frac{\partial g(x,y)}{\partial y} \tag{6}$$

Top left is the result of applying the xy-direction filter (top left and bottom left intensity and phase images in FIG. 6), giving the result:

$$\frac{\partial g(x,y)}{\partial x \partial y} \tag{7}$$

Bottom left is the result of applying the combined x and y-direction filters (left and middle intensity and phase images in FIG. 6), giving the result:

$$\frac{\partial g(x,y)}{\partial x}+\frac{\partial g(x,y)}{\partial y} \quad (8)$$

Bottom middle is the result of applying a 2-D filter based on the filter product of the x and y filters used previously (the product of the left and middle intensity and phase images in FIG. 6), giving the full 2-D derivative:

$$\frac{\partial g(x,y)}{\partial x\partial y} \quad (9)$$

Figure 10:
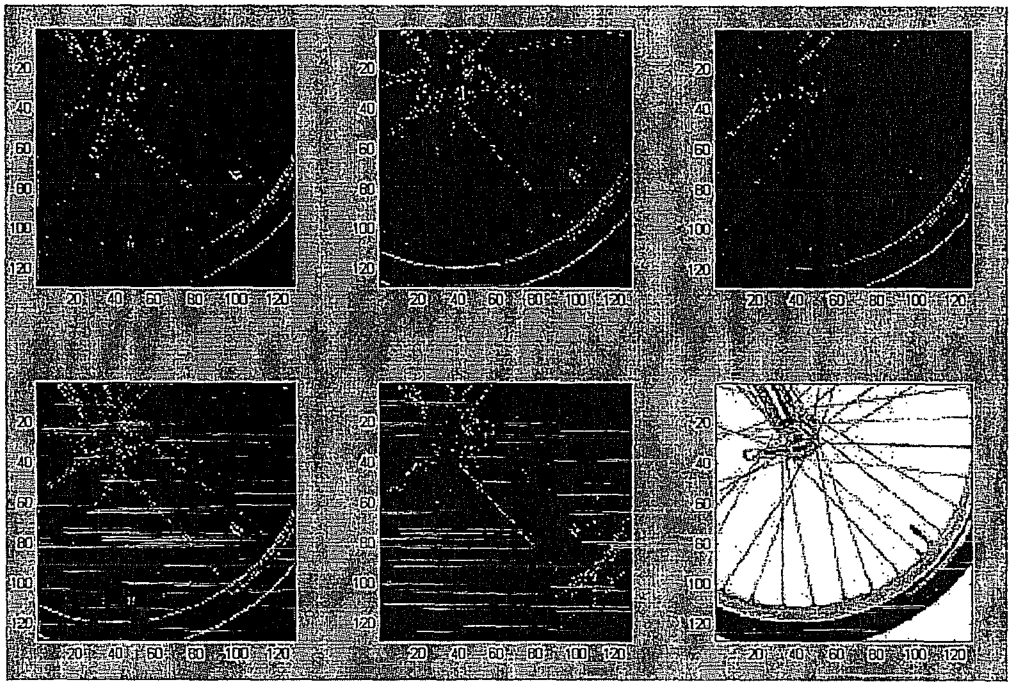
FIG. 10 shows the results of applying the first order filter in FIG. 6 to a second input function.

FIG. 10 repeats the above processes as described for FIG. 9 and in the same order, but using a second, arbitrary input function.

Hence the results shown in FIGS. 9 and 10 prove the concept and validity of the invention.

Figure 11:
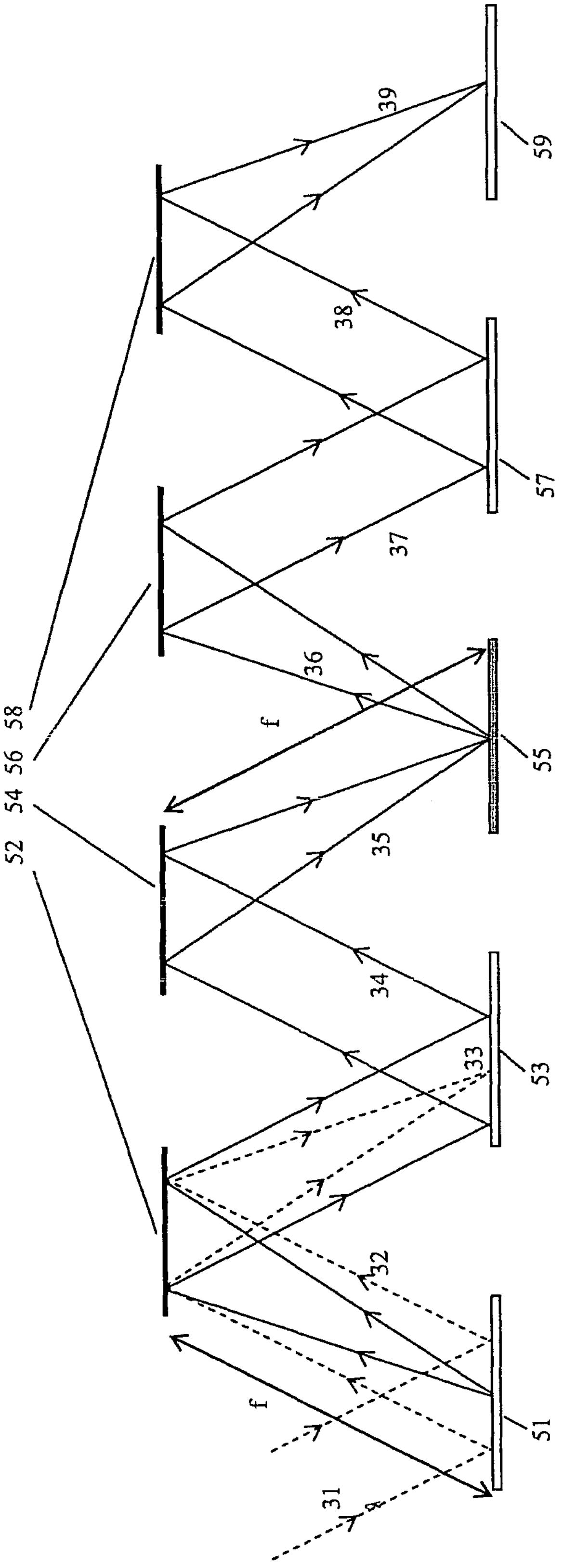
FIG. 11 shows yet another optical processing system which may be employed.

FIG. 11 shows an exemplary embodiment to show one example of the invention, in this case using a layout derived from FIG. 3 for reflective SLMs. Input collimated light 31 illuminates a reflective input SLM 51, and the resultant specularly reflected beam 32, which consists of the uniform input beam multiplied by the pixellated image on the input SLM 51, is incident upon a first diffractive optical element 52. The first diffractive optical element 52 has a reflected light beam 33 that creates an optical Fourier transform of the incoming collimated beam 32 on a second reflective SLM 53. The second reflective SLM 53 is an intensity-only SLM, and displays an intensity filter pattern. Specularly reflected light 34 from the second reflective SLM 53 is directed to a second diffractive optical element 54, which has an output beam 35 focused on a plane mirror 55. Light 36 reflected by the plane mirror 55 is incident upon a third diffractive optical element 56 so as to provide a reflected collimated beam 37 that is incident upon a third reflective SLM 57. The arrangement is such that the light incident upon the third reflective SLM 57 is substantially identical but rotated by 180 degrees, i.e. reversed, to that at the second reflective SLM 53. The third reflective SLM 57 is a phase-only SLM and displays a phase filter pattern.

Specularly reflected light 38 from the third reflective SLM 57 is incident upon a fourth diffractive optical element 58, which creates an optical Fourier transform of the incident beam 38 on an area sensor 59.

The phase filter SLM 57 is rotated 180 deg so that the effect on the light by the two SLMs 53, 57 will be as required to provide a tandem effect.

In another embodiment the DOE's used to produce the Fourier Transforms are replaced by curved mirrors. Economies may be achieved in careful design to use only a single curved mirror.

Although in the previously described embodiments SLMs that provide variable displays are used, it would also be possible in certain applications to substitute fixed devices such as for example fixed gratings.

Many of the possible arrangements envisaged will operate using reflective devices, which allows for pixel addressing via a silicon backplane. However other arrangements may use transmissive SLMs. The use of OASLMs is also envisaged.

Although specific recitation of particular types of SLMs is given in the above, this is not intended to be restrictive. Other suitable types of SLMs will readily occur to the skilled person.

The invention is not restricted to the features of the described embodiments.

What is claimed is:

1. A device for calculating derivatives of a variable, comprising:

a display configured to display an input function, an optical device configured to provide an optical Fourier transform of light from the input function, a spatial light modulation system configured to display a representation of a complex filter function, the spatial light modulation system being disposed to receive the optical Fourier transform of light from the input function, a second optical device configured to receive the product of the optical Fourier transform of light from the input function and the filter function to provide an intensity distribution, and a sensor for providing data indicative of the intensity distribution wherein the display and the spatial light modulation system comprise a single spatial light modulator.

2. The device of claim 1, wherein the spatial light modulation system has a phase-only component and an intensity-only component.

3. The device of claim 1, having operating circuitry for providing a two-dimensional distribution across the spatial light modulation system.

* * * * *

UNITED STATES PATENT AND TRADEMARK OFFICE

CERTIFICATE OF CORRECTION

PATENT NO. : 8,610,839 B2
APPLICATION NO. : 12/530058
DATED : December 17, 2013
INVENTOR(S) : Nicholas James New et al.

It is certified that error appears in the above-identified patent and that said Letters Patent is hereby corrected as shown below:

Title Page, Item (73), replace "Assignee: Optalysis Ltd., Pontefract (GB)" with --Assignee: Optalysys Ltd., Pontefract (GB)--

Signed and Sealed this
Twenty-fifth Day of March, 2014

Michelle K. Lee
*Deputy Director of the United States Patent and Trademark Office*